Nov. 27, 1923.

S. R. ROGERS 1,475,883

STOVE LIFTER

Filed Nov. 18, 1922

S. R. Rogers
INVENTOR

BY Victor J. Evans
ATTORNEY

WITNESS:

Patented Nov. 27, 1923.

1,475,883

UNITED STATES PATENT OFFICE.

SAMUEL R. ROGERS, OF DE SOTO, MISSOURI.

STOVE LIFTER.

Application filed November 18, 1922. Serial No. 601,801.

*To all whom it may concern:*

Be it known that I, SAMUEL R. ROGERS, a citizen of the United States, residing at De Soto, in the county of Jefferson and State of Missouri, have invented new and useful Improvements in Stove Lifters, of which the following is a specification.

The object of the present invention is to produce a simple, cheap and effective stove lifter which may be easily operated to grip both the upper and lower faces of the projecting lip in the lifter opening of a stove lid, so that the lid may be removed and replaced without danger of dropping or without injury to the operator.

The drawing, which accompanies and forms part of this application, illustrates a satisfactory reduction of the improvement to practice, and wherein:—

Figure 1:
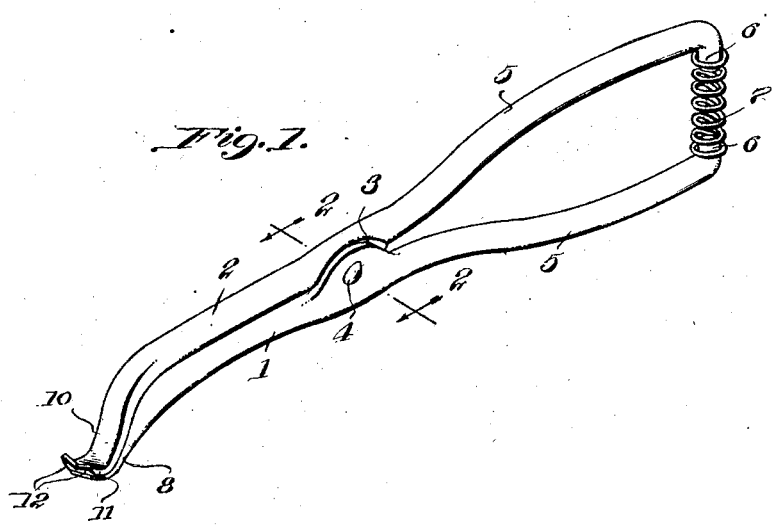
Figure 1 is a perspective view of the improvement.
Figure 2:
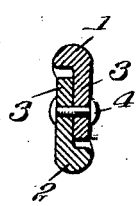
Figure 2 is a sectional view on the line 2—2 of Figure 1.
Figure 3:
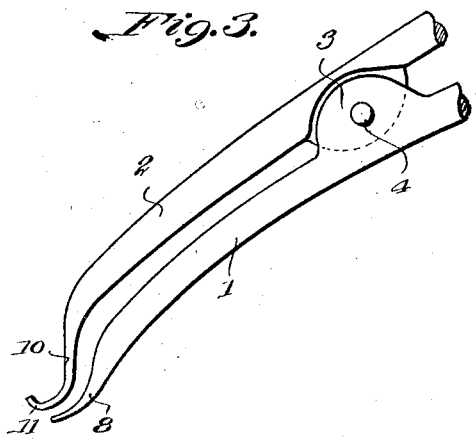
Figure 3 is a sectional view on the line 3—3 of Figure 2.

The elements constituting the improvement, except the spring, are wrought or cast preferably of cast metal, for the sake of economy.

The improvement includes a pair of arms 1 and 2 respectively which are preferably round in cross section. The arms, at equidistance from the ends thereof are each formed upon one of its sides with a reduced extending flange in the nature of an ear 3. The ears 3 are arranged in lapping relation and a pivot 4 passes through the said ears. From their pivotal connection, the arms are rounded away from each other toward one of their ends, the said rounded portions terminating in comparatively straight extensions 5, and these extensions provide the handle portions of the device. Each of the handles 5 has its end inturned, and preferably reduced to form lugs 6 respectively, and around these lugs there are arranged the ends of a coiled spring 7.

From their pivots, in a direction opposite the handles 5, the arms 1 and 2 are disposed in almost contacting relation. The end of the arm 1 is flattened and widened. This flattened and widened portion of the said arm 1 is slightly rounded toward the end of the arm 2 to provide a jaw 8. The end of the arm 2 is also flattened and widened. This flattened and widened portion is rounded downwardly toward the jaw 8 on the arm 1, as at 10, and is from thence rounded upwardly or away from the jaw 8, as at 11, and the extremity of the said portion 11 is depressed inwardly from the corners thereof whereby the corners of the extremity of the jaw 10 are formed with spaced teeth 12.

In operation, the lifter has its jaw end arranged in the usual bridged depression provided for lifters in a stove lid. The toothed end 12 of the jaw 10 will contact with the bridge of the said depression, the rounded under surface of the jaw 8 resting on the lower wall of the depression. When the lid is to be lifted, a pressure is exerted to force the handles 5 toward each other, which spreads the jaws 8 and 10, causing the jaw 8 to frictionally contact with the lower wall of the depression, and the toothed end of the jaw 10 to likewise contact with the bridge above the lower wall of the depression, the greater pressure exerted between the handle portions, causing a tighter engagement of the jaws with the wall and bridge of the depression in the stove lid, so that the lid can be readily removed from the stove and replaced thereon in an easy and convenient manner without liability of disengagement from the lifter and without inflicting injury from heat or from other causes to the hand of the user.

Having described the invention, I claim:—

As an article of manufacture, a stove lifter as herein described, comprising a pair of arms having their confronting surfaces provided with reduced lapping ears which are pivotally connected, said arms being rounded away from each other from their pivot and extended to provide handles, each of which having downturned portions, a coiled spring received between and engaged by said downturned portions, the arms, in an opposite direction from their pivot being disposed in parallel relation and slightly out of contact with each other, and having their ends flattened, widened and rounded to provide jaws, and the outer jaw having its extremity rounded upwardly and the corners thereof formed with teeth, as and for the purpose set forth.

In testimony whereof I affix my signature.

SAMUEL R. ROGERS.